United States Patent
Horn et al.

(10) Patent No.: US 11,621,750 B2
(45) Date of Patent: Apr. 4, 2023

(54) DEMODULATOR REPORT FOR SMART RECEIVER POWER OPTIMIZATION

(71) Applicant: QUALCOMM Incorporated, San Diego, CA (US)

(72) Inventors: Idan Michael Horn, Hod Hasharon (IL); Jacob Pick, Beit Zait (IL); Assaf Touboul, Netanya (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/362,133

(22) Filed: Jun. 29, 2021

(65) Prior Publication Data

US 2022/0416854 A1    Dec. 29, 2022

(51) Int. Cl.
| | |
|---|---|
| *H04L 5/12* | (2006.01) |
| *H04B 7/0456* | (2017.01) |
| *H04W 24/10* | (2009.01) |
| *H04W 28/02* | (2009.01) |
| *H04B 17/382* | (2015.01) |
| *H04L 5/00* | (2006.01) |

(52) U.S. Cl.
CPC ......... *H04B 7/0456* (2013.01); *H04B 17/382* (2015.01); *H04L 5/0007* (2013.01); *H04W 24/10* (2013.01); *H04W 28/0215* (2013.01)

(58) Field of Classification Search
CPC ... H04B 7/0456; H04B 17/382; H04L 5/0007; H04W 24/10; H04W 28/0215
USPC .......................................................... 375/262
See application file for complete search history.

(56) References Cited

U.S. PATENT DOCUMENTS

| | | | | |
|---|---|---|---|---|
| 10,404,432 | B2 * | 9/2019 | Yuk ...................... H04L 5/0044 |
| 10,419,244 | B2 * | 9/2019 | Jiang ......................... H04L 5/00 |
| 10,686,629 | B2 * | 6/2020 | Jiang ......................... H04L 5/00 |
| 10,721,038 | B2 * | 7/2020 | Kwak .................... H04W 72/12 |
| 10,863,497 | B2 * | 12/2020 | Haghighat ........... H04B 7/0628 |
| 10,993,224 | B1 * | 4/2021 | Zhang ............... H04W 72/0446 |
| 11,160,057 | B2 * | 10/2021 | Lin ....................... H04L 5/0091 |
| 11,310,011 | B2 * | 4/2022 | Hao ...................... H04L 5/0094 |
| 2010/0272201 | A1 * | 10/2010 | Nakao ............... H04L 25/03343 375/260 |
| 2020/0052866 | A1 * | 2/2020 | Manolakos ....... H04W 72/1278 |
| 2020/0136679 | A1 * | 4/2020 | Shen ...................... H04B 7/046 |
| 2021/0211169 | A1 * | 7/2021 | Xue ....................... H04B 7/024 |

FOREIGN PATENT DOCUMENTS

CN           101512929 A  *  8/2009

\* cited by examiner

*Primary Examiner* — Helene E Tayong
(74) *Attorney, Agent, or Firm* — Patterson + Sheridan, LLP

(57) ABSTRACT

Certain aspects of the present disclosure provide techniques for wireless communications by a user equipment (UE). The UE implements the technique to transmit to a network entity a report that includes an indication of a desired demodulator or precoding per precoding resource block group (PRG) for a group of one or more PRGs. The UE then demodulates downlink (DL) transmissions, transmitted from the network entity on the group of one or more PRGs, in accordance with the indication included in the report.

30 Claims, 10 Drawing Sheets

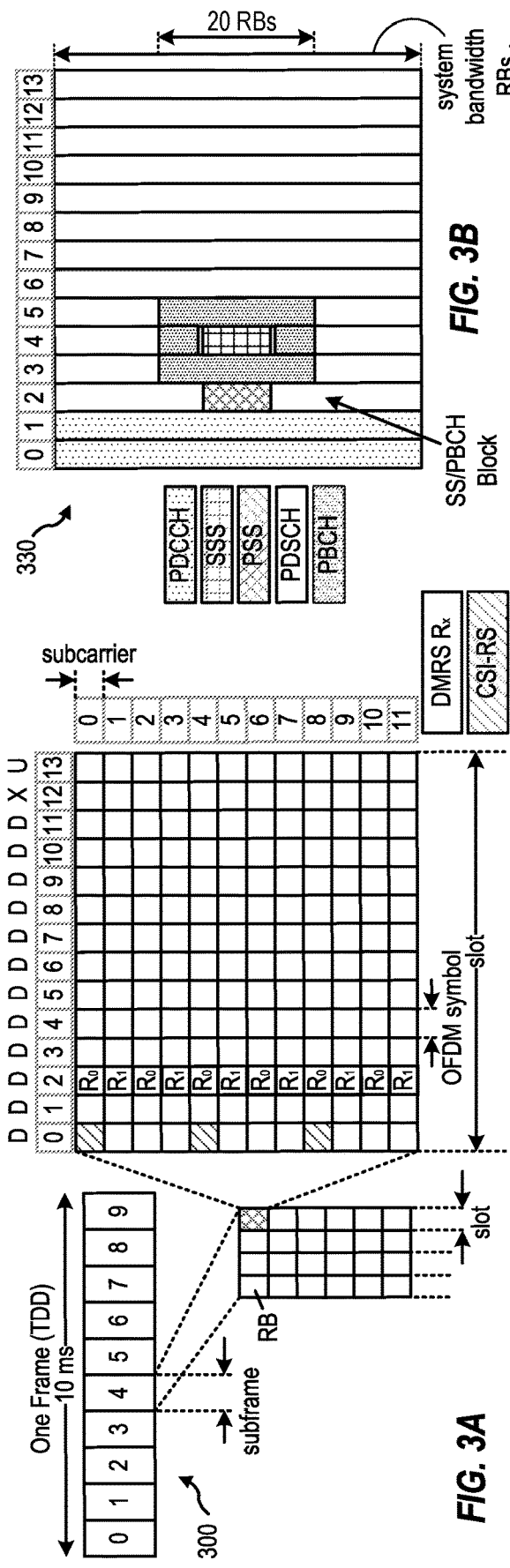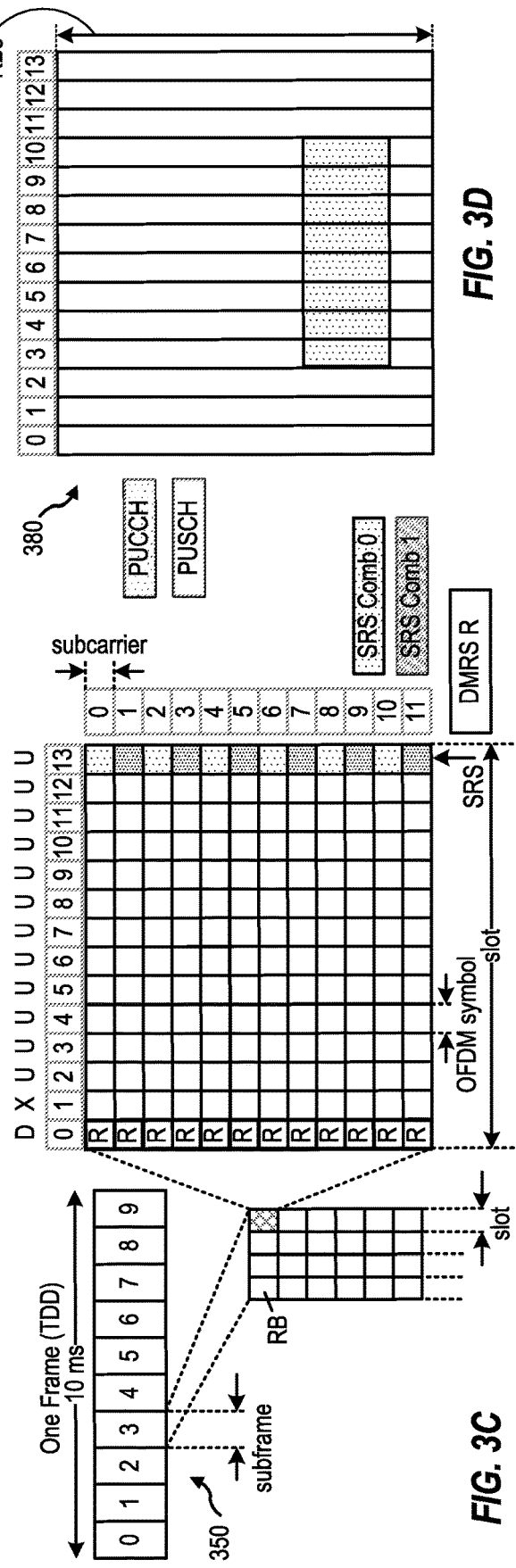

DEMODULATOR REPORT FOR SMART RECEIVER POWER OPTIMIZATION

INTRODUCTION

Aspects of the present disclosure relate to wireless communications, and more particularly, to techniques for managing precoding of each precoding resource block group (PRG) for a group of one or more PRGs.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE), including: transmitting, to a network entity, a report that includes an indication of a desired demodulator or precoding per precoding resource block group (PRG) for a group of one or more PRGs; and demodulating one or more downlink (DL) transmissions, transmitted from the network entity on the group of one or more PRGs, in accordance with the indication included in the report.

Another aspect provides a method for wireless communications by a network entity, including: receiving, from a UE, a report that includes an indication of a desired demodulator or precoding per PRG for a group of one or more PRGs; and sending, to the UE, one or more DL transmissions on the group of one or more PRGs, with precoding based on the indication included in the report.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for managing precoding of resource block groups (PRGs) in a manner that may help optimize power consumption of a user equipment (UE).

For example, the UE may implement a technique to define and send a report that indicates a UE PRG demodulator and/or a desired precoding method to a gNodeB (gNB). This report may enable the gNB to reduce its precoding power consumption and hardware complexity. In some cases, when the gNB indicates to the UE of a limited singular value decomposition (SVD) precoding, the UE may select certain PRGs to be transmitted with the SVD precoding. This may help optimize power consumption at the UE.

The technique described herein may reduce gNB precoding power consumption and complexity when the SVD precoding is used with a smart receiver. The technique described herein may also improve UE demodulator power consumption when the gNB and/or UE have a limited SVD precoding hardware.

Introduction to Wireless Communication Networks

Figure 1:
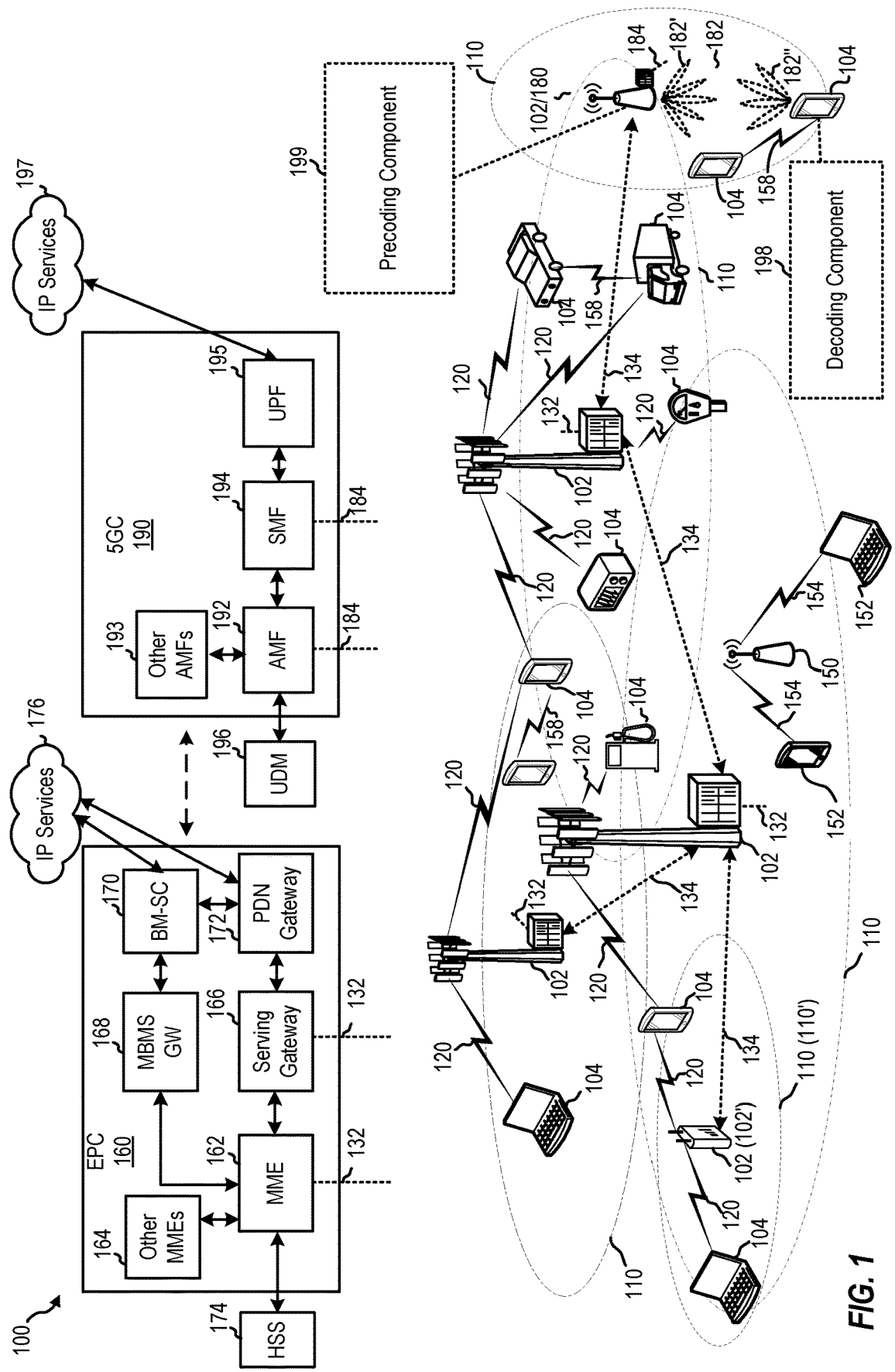
FIG. 1 is a block diagram conceptually illustrating an example wireless communication network.

FIG. 1 depicts an example of a wireless communications system 100, in which aspects described herein may be implemented.

Figure 4:
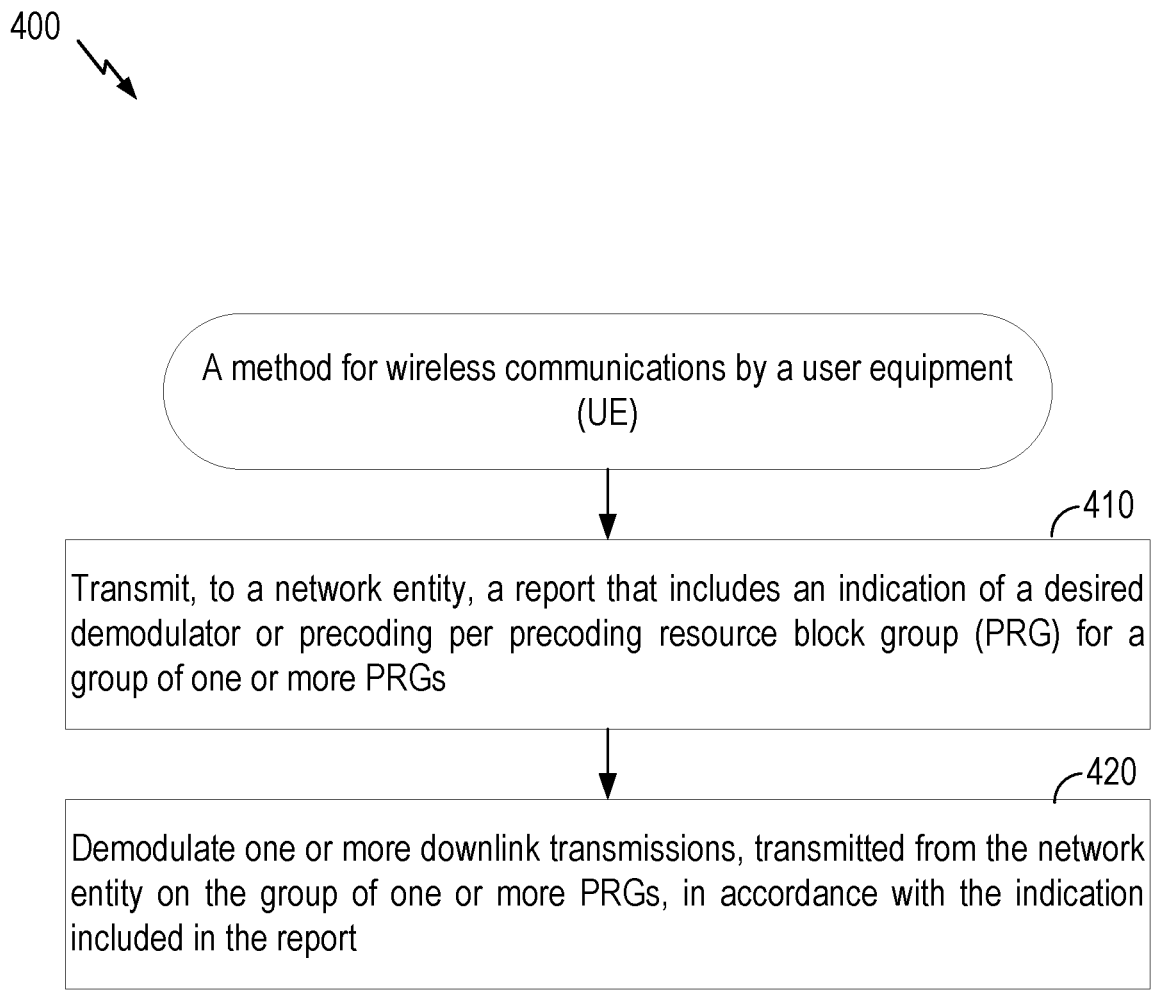
FIG. 4 depicts a flow diagram illustrating example operations for wireless communication by a UE.
Figure 5:
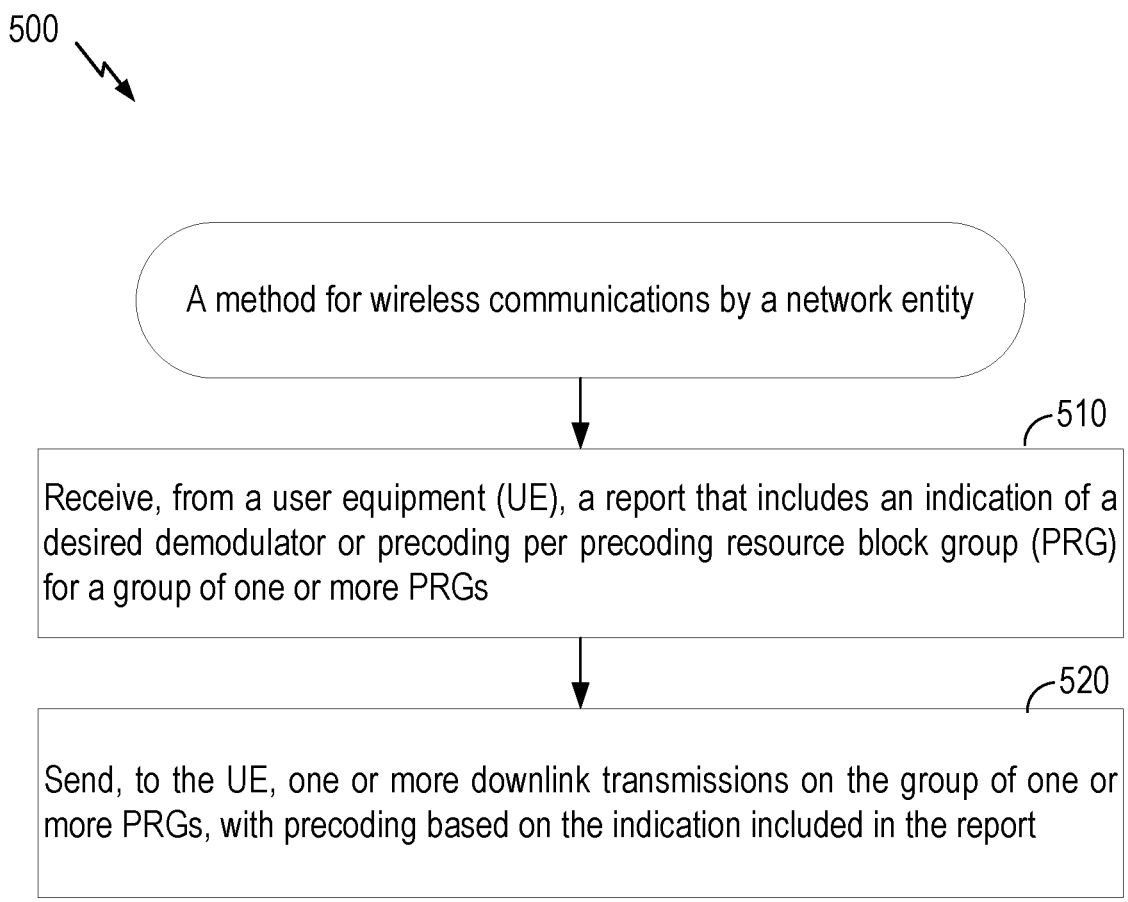
FIG. 5 depicts a flow diagram illustrating example operations for wireless communication by a network entity.

For example, wireless communication system 100 may include a precoding component 199, which may be configured to perform, or cause a base station (BS) 102 to perform, operations 500 of FIG. 5. Wireless communication network 100 may also include a decoding component 198, which may be configured to perform, or cause a user equipment (UE) 104 to perform, operations 400 of FIG. 4.

Generally, wireless communications system 100 includes BSs 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs 102 may utilize beamforming 182 with a UE 104 to improve path loss and range. For example, the BS 102 and the UE 104 may each include a plurality of antennas, such as antenna elements, antenna panels, and/or antenna arrays to facilitate the beamforming.

In some cases, a BS 102 may transmit a beamformed signal to a UE 104 in one or more transmit directions 182'. The UE 104 may receive the beamformed signal from the BS 102 in one or more receive directions 182". The UE 104 may also transmit a beamformed signal to the BS 102 in one or more transmit directions 182". The BS 102 may also receive the beamformed signal from the UE 104 in one or more receive directions 182'. The BS 102 and the UE 104 may then perform beam training to determine the best receive and transmit directions for each of BS 102 and UE 104. Notably, the transmit and receive directions for the BS 102 may or may not be the same. Similarly, the transmit and receive directions for the UE 104 may or may not be the same.

Figure 2:
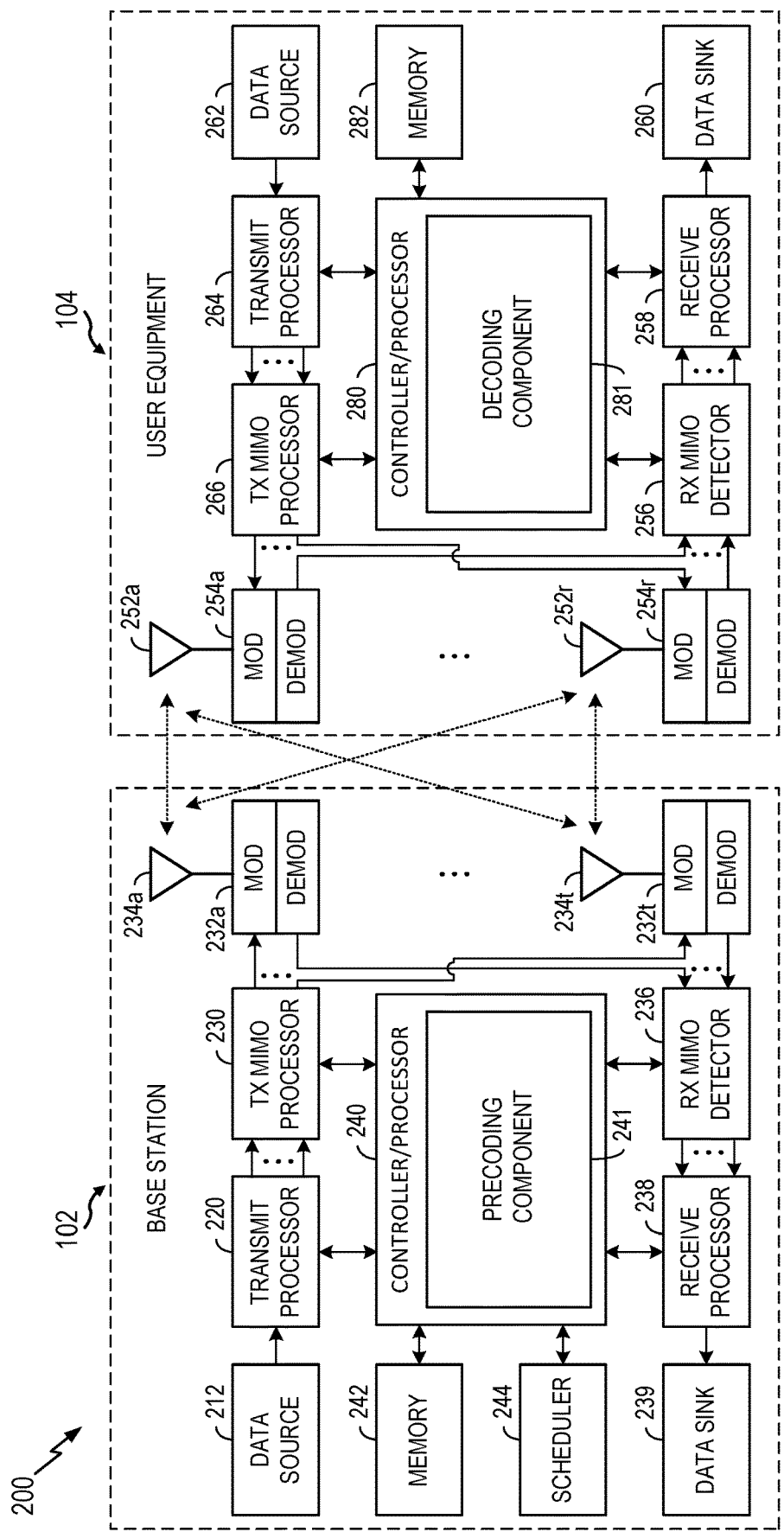
FIG. 2 is a block diagram conceptually illustrating aspects of an example base station (BS) and a user equipment (UE).

FIG. 2 depicts aspects of an example base station (BS) 102 and a user equipment (UE) 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes a precoding component 241, which may be representative of a precoding component 199 of FIG. 1. Notably, while depicted as an aspect of controller/processor 240, the precoding component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes a decoding component 281, which may be representative of the decoding component 198 of FIG. 1. Notably, while depicted as an aspect of controller/processor 280, the decoding component 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Overview of Multiple Input Multiple Output Wireless Communications

In a multiple input multiple output (MIMO) based wireless communication system, a transmitting device may include transmit antennas and may be configured to transmit multiple signals (i.e., multiple parallel streams) to the at least one receiving device. A receiving device may include multiple receive antennas and may be configured to receive and process the signals transmitted (i.e., separate the signals and streams) from the transmitting device.

The MIMO is generally used to increase overall throughput by transmitting multiple different data streams on multiple different antennas, using same resources in both frequency and time. This separation is possible by using different reference signals, allowing different streams to be received by different receive antennas.

A base station (BS) of the wireless communication system may serve as the transmitting device for downlink (DL) communications and the receiving device for uplink (UL) communications. Conversely, a user equipment (UE) of the wireless communication system may serve as the receiving device for the DL communications and the transmitting device for the UL communications.

Overview of Minimum Mean Squared Error (MMSE) Demodulator

In certain wireless communication systems (e.g., $5^{th}$ generation (5G) new radio (NR)), a user equipment (UE) and a base station (BS) may consume significant amounts of power. The overall power consumption is from a number of sources, such as power consumed by antenna elements, and signal processing using analog-to-digital converters (ADCs), digital-front-end (DFE) and baseband processing.

One of the primary challenges in 5G NR is to reduce power consumption of the UE, due to limited battery power. Several techniques are implemented to improve power efficiency (bit per joule) of the UE. In one example technique, to improve the power efficiency of the UE (e.g., a radio frequency integrated circuit (RFIC)), a number of layers (streams, or rank) may be increased (due to reuse of shared elements). However, when the number of layers are increased, more complex algorithms at a baseband may be required to separate the streams, which increases the overall power consumption of the UE.

The UE may use one or more demodulators to demodulate transmissions and streams from the BS. One example demodulator is a maximum likelihood (ML) estimator. When the number of layers is increased, the ML estimator has an exponential increase in complexity relative to the number of layers. Accordingly, due to the high complexity of the ML estimator, the ML estimator is often not implemented in the UE and other demodulators may be used.

Other demodulators may include a lower power demodulator such as a minimum mean squared error (MMSE) demodulator. Although the MMSE demodulator may have some degradation compared to common sub-optimal demodulators such as the ML estimator with reduced search space algorithms, however, in some scenarios, the MMSE demodulator have similar performance results compared to the ML estimator. For example, in operation, the BS may determine a power delay profile (PDP) of a downlink (DL) channel based on an uplink (UL) sounding reference signal (SRS) and a reciprocity assumption. In some cases, the UE may indicate the PDP to the BS. When the BS determines or receives the PDP of the DL channel, the BS can apply precoding such as a singular value decomposition (SVD) precoding that maximizes a capacity and layers separation (such that the UE may see each layer on a different eigenvalue of a channel). In such cases, when the layers have almost zero cross layers leakage, the MMSE demodulator has the same performance as the ML estimator. If the MMSE demodulator provides the same performance as the ML estimator, the use of MMSE demodulator may be more advantageous than the ML estimator since the MMSE demodulator uses less power than the ML estimator. Therefore, there it may be desirable to maximize an amount of the MMSE demodulators used by the UE since it will significantly reduce overall digital power consumption of the UE.

In some cases, the MMSE demodulator may have a similar performance as the ML estimator when the BS applies the SVD precoding on a small sub band (e.g., precoding resource block group (PRG)=1 resource group (RB)). However, SVD precoding may require high complexity that may translate to the BS power consumption of $O(mn^2*N_{PRG})$(m>n, n×n— matrix size) floating point operations (flop).

In some cases, the BS may have a limited hardware to apply the SVD precoding. Thus, when the BS is not able to apply the SVD precoding on all PRGs due to the limited hardware, it may reduce an amount of the MMSE demodulators used by the UE. This is because the UE may use the MMSE demodulators only for transmissions transmitted from the BS on the PRGs with the SVD precoding. Since less number of low power MMSE demodulators are used and more number of other demodulators may be used, the power consumption of the UE is increased.

Accordingly, to reduce the BS complexity and the power consumption of the UE, aspects of the present disclosure propose a UE demodulator report (or a desired precoding method report), which includes information associated with a demodulator used per PRG. The BS may use the UE demodulator report from the UE to apply the SVD precoding only on the PRGs reported with the MMSE demodulator. This will maximize the amount of the MMSE demodulators used by the UE and reduce the power consumption of the UE.

Aspects Related to Demodulator Report for Smart Receiver Power Optimization

Aspects of the present disclosure provide apparatuses, methods, processing systems, and computer-readable mediums for defining and reporting a precoding resource block group (PRG) demodulator report (or a desired precoding method report) to optimize power consumption of a user equipment (UE).

FIG. 4 depicts a flow diagram illustrating example operations 400 for wireless communication. The operations 400 may be performed, for example, by a UE (e.g., such as the UE 104 in the wireless communication network 100 of FIG. 1). The operations 400 may be implemented as software components that are executed and run on one or more processors (e.g., the controller/processor 280 of FIG. 2). Further, transmission and reception of signals by the UE in operations 400 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 400 begin, at 410, by transmitting to a network entity a report that includes an indication of a desired demodulator or precoding per PRG for a group of one or more PRGs. For example, the UE may transmit the report to the network entity using antenna(s) and transmitter/transceiver components of the UE 104 shown in FIG. 1 or FIG. 2 and/or of the apparatus shown in FIG. 9.

At 420, the UE demodulates one or more downlink (DL) transmissions transmitted from the network entity on the group of one or more PRGs in accordance with the indication included in the report. The UE may demodulate the one or more DL transmissions transmitted from the network entity using a processor (or a demodulator) of the UE 104 shown in FIG. 1 or FIG. 2 and/or of the apparatus shown in FIG. 9.

FIG. 5 is a flow diagram illustrating example operations 500 for wireless communication. The operations 500 may be performed, for example, by a network entity (e.g., such as the BS 102 in the wireless communication network 100 of FIG. 1). The operations 500 may be implemented as software components that are executed and run on one or more processors (e.g., the controller/processor 240 of FIG. 2). Further, transmission and reception of signals by the network entity in operations 500 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 500 begin, at block 510, by receiving from a UE a report that includes an indication of a desired demodulator or precoding per PRG for a group of one or more PRGs. For example, the network entity may receive the report from the UE using antenna(s) and receiver/transceiver components of the BS 102 shown in FIG. 1 or FIG. 2 and/or of the apparatus shown in FIG. 10.

At 520, the network entity sends to the UE one or more DL transmissions on the group of one or more PRGs with precoding based on the indication included in the report. For example, the network entity may send the one or more DL transmissions to the UE using antenna(s) and transmitter/transceiver components of the BS 102 shown in FIG. 1 or FIG. 2 and/or of the apparatus shown in FIG. 10.

Figure 6:
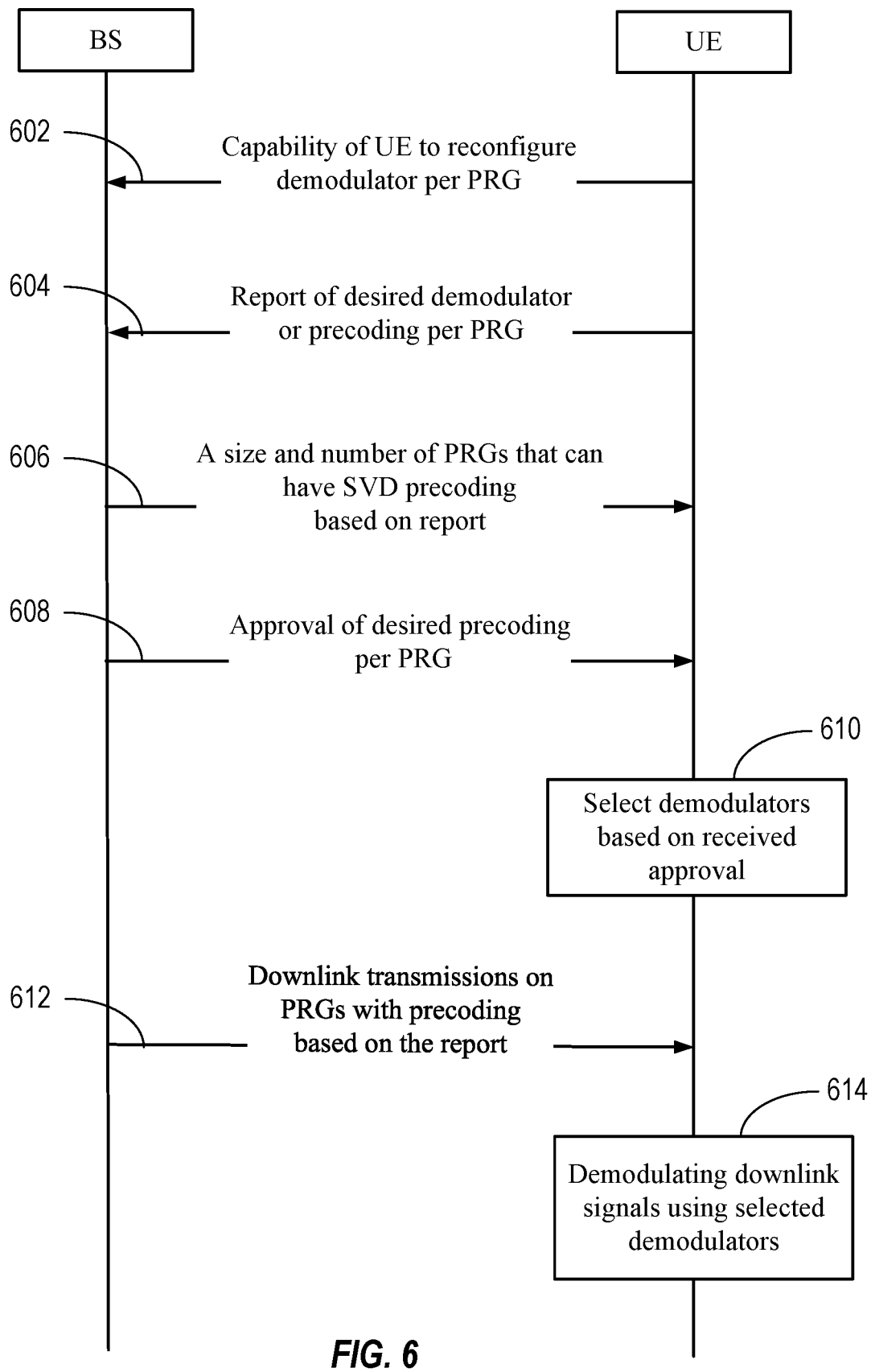
FIG. 6 depicts a call flow diagram illustrating example signaling for reporting desired demodulator or precoding per precoding resource block group (PRG) for a group of one or more PRGs.

The operations shown in FIGS. 4 and 5 may be understood with reference to the call flow diagram of FIG. 6.

As illustrated in FIG. 6, at 602, a UE (e.g., the UE 104 shown in FIG. 1 or FIG. 2) sends signaling to a BS (e.g., the BS 102 shown in FIG. 1 or FIG. 2) indicating usage capability of multiple demodulators of the UE for smart receiver power optimization. In certain aspects, the capability of the UE signaled to the BS includes an ability of the UE to reconfigure at least one demodulator per PRG.

At 604, the UE sends a report to the BS. The report includes an indication of a desired demodulator or precoding per PRG for a group of one or more PRGs.

In certain aspects, the report indicates the demodulators of the UE that require a singular value decomposition (SVD) precoding, a partial SVD precoding or a random precoding.

In certain aspects, the report explicitly indicates a first set of PRGs from the group of one or more PRGs that require the SVD precoding. Each of the first set of PRGs have (be processed by) one or more demodulators. The one or more demodulators may be low power usage demodulators. In certain aspects, if the UE receives an indication of a maximum number of PRGs that can have a SVD precoding from the BS, then the UE may try to ensure that the first set of PRGs for the SVD precoding included in the report is less than the maximum number of PRGs indicated by the BS.

In certain aspects, the report explicitly indicates a second set of PRGs from the group of one or more PRGs for the precoding other than the SVD precoding. In one example, the report may indicate the second set of PRGs for the partial SVD precoding. In another example, the report may indicate the second set of PRGs for the random precoding.

In certain aspects, the indication of the desired demodulator in the report may include an integer value representing a specific demodulator from a look up table (LUT) given in a connection establishment. In one non-limiting example, the UE may indicate a value of '1', which may represent a first type of demodulator such as a minimum mean squared error (MMSE) demodulator. In another non-limiting example, the UE may indicate a value of '2', which may represent a second type of demodulator.

In certain aspects, the indication of the desired precoding in the report may include an integer value representing an SVD precoding, a partial SVD precoding, a random precoding, or no decoding. In one non-limiting example, the indication may include 0, which may represent no precoding. In another non-limiting example, the indication may include 1, which may represent the SVD precoding. In another non-limiting example, the indication may include 2, which may represent the partial SVD precoding. In another non-limiting example, the indication may include 3, which may represent the random precoding.

In certain aspects, the report is sent to the BS via a radio resource control (RRC) message. In certain aspects, the report is sent to the BS via a physical uplink shared channel (PUSCH). In certain aspects, the report is sent to the BS via a channel state feedback (CSF) message. In certain aspects, the report is sent to the BS via a combination of the RRC message, the PUSCH, and/or the CSF message.

At 606, the BS sends to the UE signaling indicating a size and a number of PRGs from the group of one or more PRGs that can have the SVD precoding. In certain aspects, the PRG size may depend on a SVD resolution and accuracy.

In certain aspects, the BS determines the size and/or the number of PRGs from the group of one or more PRGs that can have the SVD precoding based on a hardware load usage of the BS. In one non-limiting example, the hardware load usage of the BS depends on a number of UEs (e.g., in a multi multiple input multiple output (MIMO) system). In another non-limiting example, the hardware load usage of the BS depends on a performance of the BS. In another non-limiting example, the hardware load usage of the BS depends on a temperature of the BS.

In certain aspects, the signaling indicating the size and the number of PRGs from the group of one or more PRGs that can have the SVD precoding is transmitted via a radio resource control (RRC) message. In certain aspects, the signaling is transmitted via a medium access control (MAC)-control element (CE) message. In certain aspects, the signaling may be changed in a periodic manner. In certain aspects, the signaling may be changed in an aperiodic manner.

In certain aspects, the UE may send a request to the BS to reduce a size of at least one PRG from the group of one or more PRGs that can have the SVD precoding. The UE may send this request to increase power efficiency of the demodulators of the UE. The BS may reduce the size of the at least one PRG based on the request.

At 608, the BS sends to the UE signaling indicating an approval of the desired precoding per PRG from the group of one or more PRGs based at least on the indication included in the report. In one non-limiting example, the BS approves the desired precoding for each PRG in the group of one or more PRGs based on the report. In another non-limiting example, the BS approves the desired precoding for some PRGs in the group of one or more PRGs based on the report.

At 610, the UE selects the demodulators based on the received approval.

At 612, the BS sends one or more DL transmissions on the group of one or more PRGs with the precoding based on the indication included in the report.

At 614, the UE demodulates the one or more DL transmissions (on the group of one or more PRGs, in accordance with the indication included in the report) using the selected demodulators.

Figure 7:
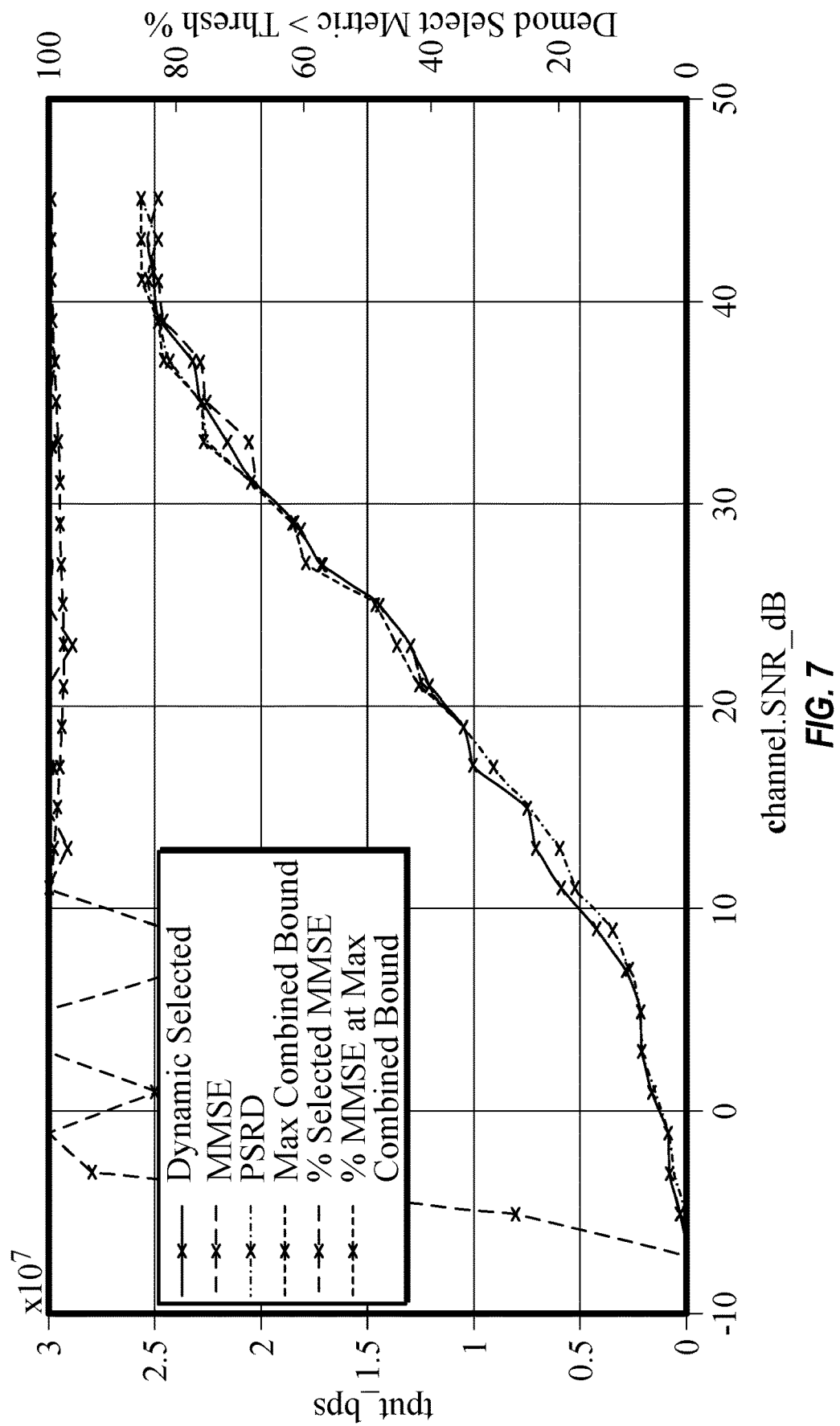
FIGS. 7 and 8 depict examples of amount of usage of minimum mean squared error (MMSE) demodulators by a UE in different scenarios.
Figure 8:
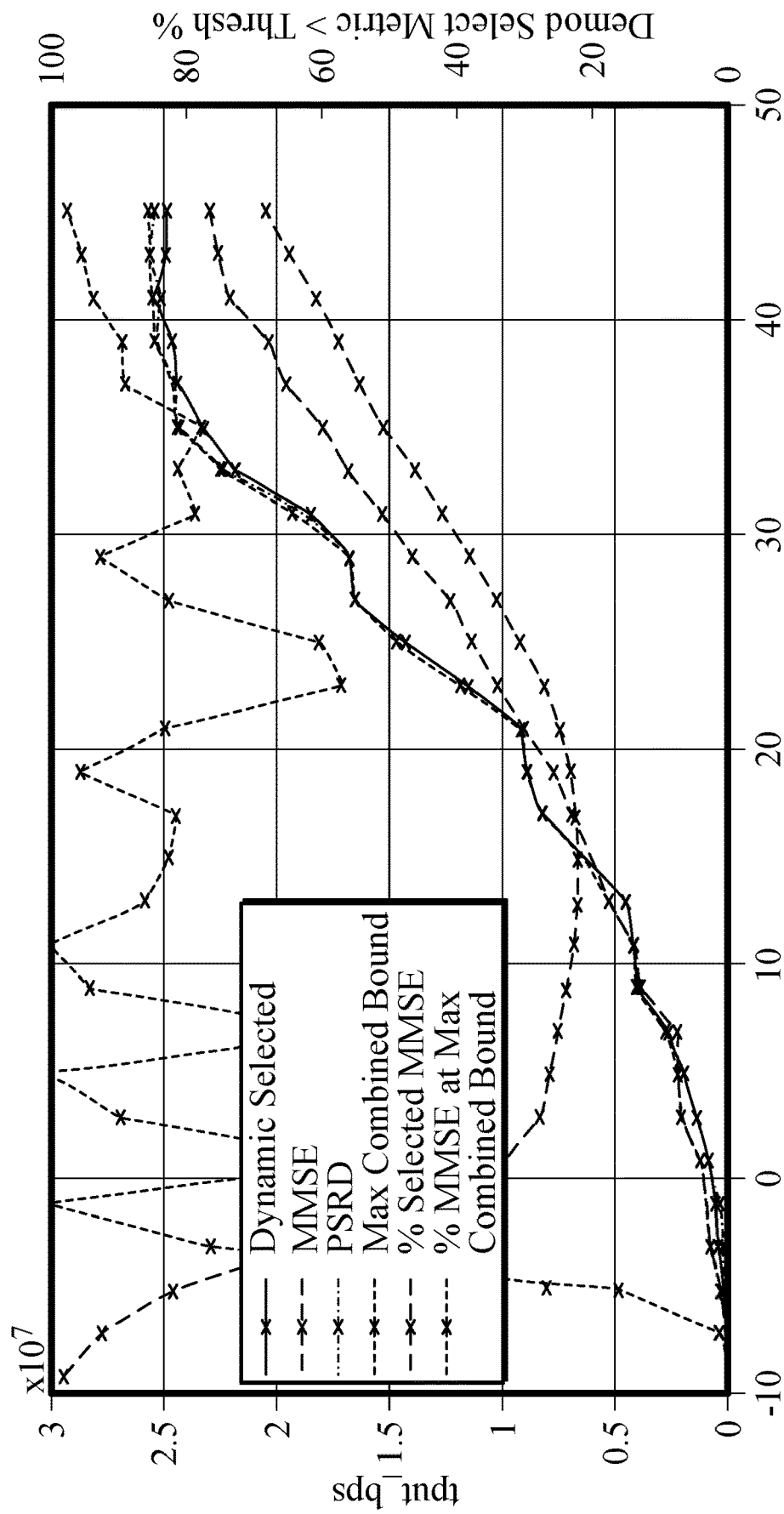

FIGS. 7 and 8 illustrate example amounts of usage of MMSE demodulators (i.e., low power demodulators) in different scenarios (with different speeds). For example, both plots illustrate a maximum amount of the MMSE demodulators that can be used by a UE without a performance loss with respect to per stream recursive demapping (PSRD). Per signal to noise ratio (SNR) and channel, the usage percentage of the MMSE demodulators can be changed, and the usage of the MMSE demodulators by the UE may vary, for example, from 60% to 100%. In such cases, a UE may report about 0% to 40% PRGs that may have a low power consumption precoding, which differs from a SVD precoding.

As further illustrated in FIGS. 7 and 8, a percentage of MMSE demodulators selected and dynamically selected demodulators may indicate an optional algorithm for optimizing the power efficiency of the UE by a minimal performance loss and with usage of a maximum number of MMSE demodulators. Per the SNR and the channel, the usage percentage of the MMSE demodulators can be changed and the usage of the MMSE demodulators by the UE may vary. For example, in optimal cases, the usage of MMSE demodulators by the UE is identical to reported SVD precoding to maximize the number of MMSE demodulators used without the performance loss.

Example Wireless Communication Devices

Figure 9:
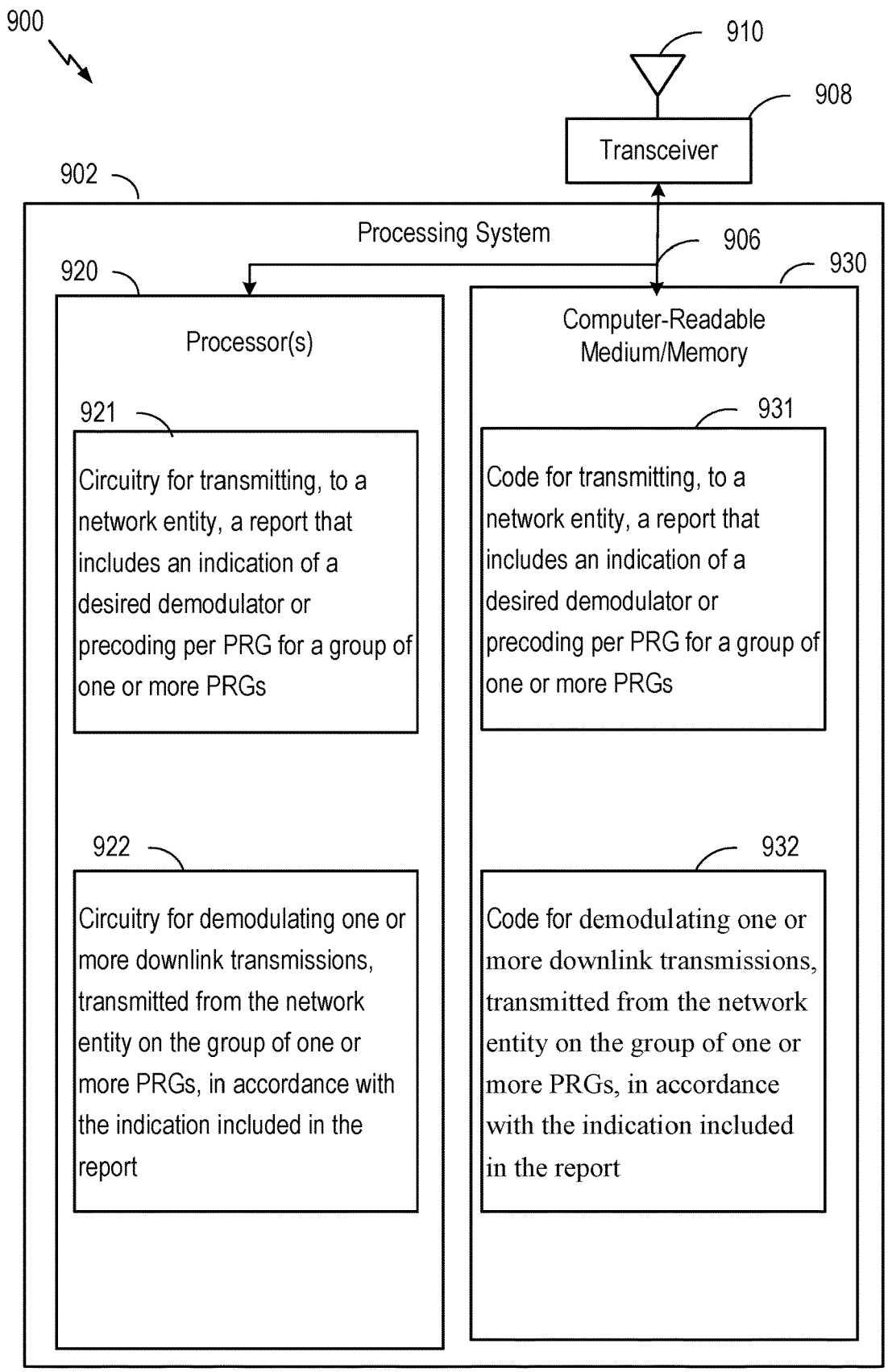
FIG. 9 depicts aspects of an example communications device.

FIG. 9 depicts an example communications device 900 that includes various components operable, configured, or adapted to perform operations for the techniques disclosed herein, such as the operations depicted and described with respect to FIG. 4. In some examples, communication device 900 may be a user equipment (UE) 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 4, or other operations for performing the various techniques discussed herein.

In the depicted example, computer-readable medium/memory 930 stores code 931 for transmitting to a network entity a report that includes an indication of a desired demodulator or precoding per precoding resource block group (PRG) for a group of one or more PRGs and code 932 for demodulating one or more downlink (DL) transmissions transmitted from the network entity on the group of one or more PRGs in accordance with the indication included in the report.

In the depicted example, the one or more processors 920 include circuitry configured to implement the code stored in the computer-readable medium/memory 930, including circuitry 921 for transmitting to a network entity a report that includes an indication of a desired demodulator or precoding per PRG for a group of one or more PRGs and circuitry 922 for demodulating one or more DL transmissions transmitted from the network entity on the group of one or more PRGs in accordance with the indication included in the report.

Various components of communications device 900 may provide means for performing the methods described herein, including with respect to FIG. 4.

In some examples, means for transmitting or sending (or means for outputting for transmission) may include the transceivers 254 and/or antenna(s) 252 of the UE 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the UE 104 illustrated in FIG. 2 and/or transceiver 908 and antenna 910 of the communication device 900 in FIG. 9.

In some examples, means for transmitting to a network entity a report that includes an indication of a desired demodulator or precoding per PRG for a group of one or more PRGs and means for demodulating one or more DL transmissions transmitted from the network entity on the group of one or more PRGs in accordance with the indication included in the report, may include various processing system components, such as: the one or more processors 920 in FIG. 9, or aspects of the UE 104 depicted in FIG. 2, including receive processor 258, transmit processor 264, TX MIMO processor 266, and/or controller/processor 280 (including MIMO component 281).

Notably, FIG. 9 is just use example, and many other examples and configurations of communication device 900 are possible.

Figure 10:
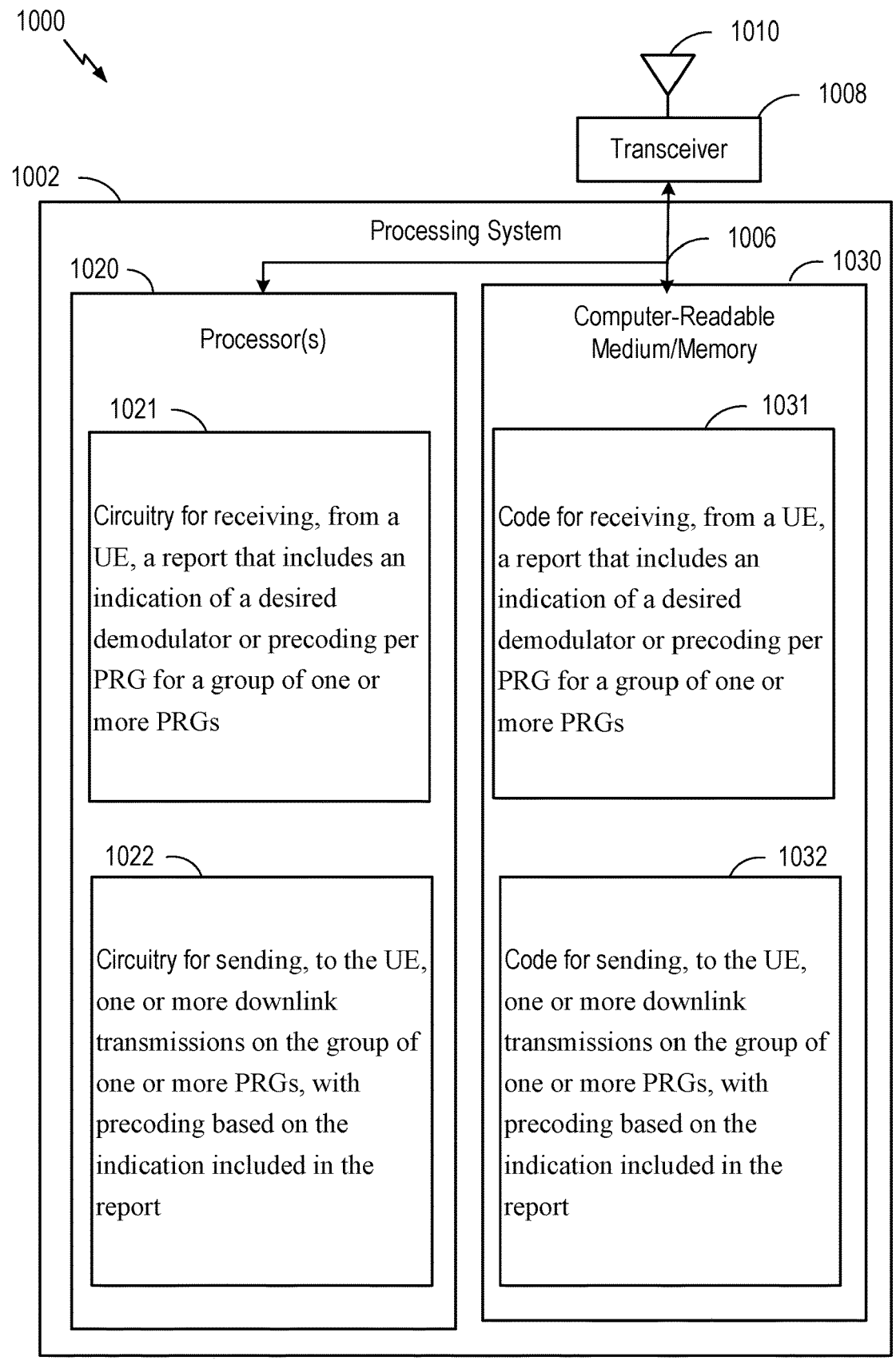
FIG. 10 depicts aspects of an example communications device.

FIG. 10 depicts an example communications device 1000 that includes various components operable, configured, or adapted to perform operations for the techniques disclosed herein, such as the operations depicted and described with respect to FIG. 5. In some examples, communication device 1000 may be a base station (BS) 102 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIG. 5, or other operations for performing the various techniques discussed herein.

In the depicted example, computer-readable medium/memory 1030 stores code 1031 for receiving from a UE a report that includes an indication of a desired demodulator or precoding per PRG for a group of one or more PRGs and code 1032 for sending to the UE one or more DL transmissions on the group of one or more PRGs with precoding based on the indication included in the report.

In the depicted example, the one or more processors 1020 include circuitry configured to implement the code stored in the computer-readable medium/memory 1030, including circuitry 1021 for receiving from a UE a report that includes an indication of a desired demodulator or precoding per PRG for a group of one or more PRGs and circuitry 1022 for sending to the UE one or more DL transmissions on the group of one or more PRGs with precoding based on the indication included in the report.

Various components of communications device 1000 may provide means for performing the methods described herein, including with respect to FIG. 5.

In some examples, means for transmitting or sending (or means for outputting for transmission) may include the transceivers 232 and/or antenna(s) 234 of the BS 102 illustrated in FIG. 2 and/or transceiver 1008 and antenna 1010 of the communication device 1000 in FIG. 10.

In some examples, means for receiving (or means for obtaining) may include the transceivers 232 and/or antenna(s) 234 of the BS 102 illustrated in FIG. 2 and/or transceiver 1008 and antenna 1010 of the communication device 1000 in FIG. 10.

In some examples, means for receiving from a UE a report that includes an indication of a desired demodulator or precoding per PRG for a group of one or more PRGs and means for sending to the UE one or more DL transmissions on the group of one or more PRGs with precoding based on the indication included in the report, may include various processing system components, such as: the one or more processors 1020 in FIG. 10, or aspects of the BS 102 depicted in FIG. 2, including receive processor 238, transmit processor 220, TX MIMO processor 230, and/or controller/processor 240 (including MIMO component 241) and the rule may include various processing system components, such as: the one or more processors 1020 in FIG. 10, or aspects of the BS 102 depicted in FIG. 2, including receive processor 258, transmit processor 264, TX MIMO processor 266, and/or controller/processor 280 (including MIMO component 281).

Notably, FIG. 10 is just use example, and many other examples and configurations of communication device 1000 are possible.

Example Clauses

Implementation examples are described in the following numbered clauses:

Clause 1: A method for wireless communications by a user equipment (UE), comprising: transmitting, to a network entity, a report that includes an indication of a desired demodulator or precoding per precoding resource block group (PRG) for a group of one or more PRGs; and demodulating one or more downlink (DL) transmissions, transmitted from the network entity on the group of one or more PRGs, in accordance with the indication included in the report.

Clause 2: The method alone or in combination with the first clause, wherein the indication comprises an integer value representing a specific demodulator from a look up table (LUT).

Clause 3: The method alone or in combination with one or more of the first and second clauses, wherein the indication comprises an integer value representing a singular value decomposition (SVD) precoding, a partial SVD precoding, or a random precoding.

Clause 4: The method alone or in combination with one or more of the first through third clauses, wherein the report is transmitted to the network entity via one or more of a radio resource control (RRC) message, a physical uplink shared channel (PUSCH), or a channel state feedback (CSF) message.

Clause 5: The method alone or in combination with one or more of the first through fourth clauses, further comprising transmitting a request to the network entity to reduce a size of at least one PRG from the group of one or more PRGs.

Clause 6: The method alone or in combination with one or more of the first through fifth clauses, further comprising transmitting, to the network entity, signaling indicating a capability of the UE to reconfigure at least one demodulator per PRG for the group of one or more PRGs.

Clause 7: The method alone or in combination with one or more of the first through sixth clauses, further comprising receiving, from the network entity, an indication of a maximum number of PRGs that can have a singular value decomposition (SVD) precoding.

Clause 8: The method alone or in combination with one or more of the first through seventh clauses, wherein: the report indicates a first set of PRGs from the group of one or more PRGs for the SVD precoding; and each of the first set of PRGs have one or more demodulators.

Clause 9: The method alone or in combination with one or more of the first through eighth clauses, wherein the report indicates a second set of PRGs from the group of one or more PRGs for either a partial singular value decomposition (SVD) precoding or a random precoding.

Clause 10: The method alone or in combination with one or more of the first through ninth clauses, further comprising receiving signaling from the network entity indicating a size and a number of PRGs from the group of one or more PRGs that can have a singular value decomposition (SVD) precoding, in response to the indication.

Clause 11: The method alone or in combination with one or more of the first through tenth clauses, further comprising receiving signaling from the network entity indicating an approval of the desired precoding per PRG from the group of one or more PRGs based on the indication included in the report.

Clause 12: a method for wireless communications by a network entity, comprising: receiving, from a user equipment (UE), a report that includes an indication of a desired demodulator or precoding per precoding resource block group (PRG) for a group of one or more PRGs; and sending, to the UE, one or more downlink (DL) transmissions on the group of one or more PRGs, with precoding based on the indication included in the report.

Clause 13: The method alone or in combination with the twelfth clause, wherein the indication comprises an integer value representing a specific demodulator from a look up table (LUT).

Clause 14: The method alone or in combination with one or more of the twelfth and thirteenth clauses, wherein the indication comprises an integer value representing a singular value decomposition (SVD) precoding, a partial SVD precoding, or a random precoding.

Clause 15: The method alone or in combination with one or more of the twelfth through fourteenth clauses, wherein the report is received via one or more of a radio resource control (RRC) message, a physical uplink shared channel (PUSCH), or a channel state feedback (CSF) message.

Clause 16: The method alone or in combination with one or more of the twelfth through fifteenth clauses, further comprising receiving a request from the UE to reduce a size of at least one PRG from the group of one or more PRGs.

Clause 17: The method alone or in combination with one or more of the twelfth through sixteenth clauses, further comprising receiving, from the UE, signaling indicating a capability of the UE to reconfigure at least one demodulator per PRG for the group of one or more PRGs.

Clause 18: The method alone or in combination with one or more of the twelfth through seventeenth clauses, further comprising transmitting, to the UE, an indication of a maximum number of PRGs that can have a singular value decomposition (SVD) precoding.

Clause 19: The method alone or in combination with one or more of the twelfth through eighteenth clauses, wherein: the report indicates a first set of PRGs from the group of one or more PRGs for a singular value decomposition (SVD) precoding; and each of the first set of PRGs have one or more demodulators.

Clause 20: The method alone or in combination with one or more of the twelfth through nineteenth clauses, wherein the report indicates a second set of PRGs from the group of one or more PRGs for either a partial singular value decomposition (SVD) precoding or a random precoding.

Clause 21: The method alone or in combination with one or more of the twelfth through twentieth clauses, further comprising transmitting signaling to the UE indicating a size and a number of PRGs from the group of one or more PRGs that can have a singular value decomposition (SVD) precoding, in response to the indication.

Clause 22: The method alone or in combination with one or more of the twelfth through twenty-first clauses, wherein the size and the number of PRGs from the group of one or more PRGs that can have the SVD precoding is based at least on a hardware load usage of the network entity.

Clause 23: The method alone or in combination with one or more of the twelfth through twenty-second clauses, wherein the signaling is transmitted via a radio resource control (RRC) message or a medium access control (MAC)-control element (CE) message, and is changed in a periodic or aperiodic manner.

Clause 24: The method alone or in combination with one or more of the twelfth through twenty-third clauses, further comprising transmitting signaling to the UE indicating an approval of the desired precoding per PRG from the group of one or more PRGs based on the indication included in the report.

Clause 25: An apparatus, comprising: a memory comprising executable instructions; one or more processors configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by one or more processors of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of demodulator report for smart receiver power optimization in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    transmitting, to a network entity, a report that includes an indication of a desired precoding comprising a singular value decomposition (SVD) precoding, a partial SVD precoding, or a random precoding per precoding resource block group (PRG) for a group of one or more PRGs; and
    demodulating one or more downlink (DL) transmissions, transmitted from the network entity on the group of one or more PRGs, in accordance with the indication included in the report.

2. The method of claim 1, wherein the report further includes an indication of a desired demodulator, and wherein the indication comprises an integer value representing a specific demodulator from a look up table (LUT).

3. The method of claim 1, wherein the indication comprises an integer value representing the SVD precoding, the partial SVD precoding, or the random precoding.

4. The method of claim 1, wherein the report is transmitted to the network entity via one or more of a radio resource control (RRC) message, a physical uplink shared channel (PUSCH), or a channel state feedback (CSF) message.

5. The method of claim 1, further comprising transmitting a request to the network entity to reduce a size of at least one PRG from the group of one or more PRGs.

6. The method of claim 1, further comprising transmitting, to the network entity, signaling indicating a capability of the UE to reconfigure at least one demodulator per PRG for the group of one or more PRGs.

7. The method of claim 1, further comprising receiving, from the network entity, an indication of a maximum number of PRGs that can have the SVD precoding.

8. The method of claim 7, wherein:
the report indicates a first set of PRGs from the group of one or more PRGs for the SVD precoding; and
each of the first set of PRGs have one or more demodulators.

9. The method of claim 1, wherein the report indicates a second set of PRGs from the group of one or more PRGs for either the partial SVD precoding or the random precoding.

10. The method of claim 1, further comprising receiving signaling from the network entity indicating a size and a number of PRGs from the group of one or more PRGs that can have the SVD precoding, in response to the indication.

11. The method of claim 1, further comprising receiving signaling from the network entity indicating an approval of the desired precoding per PRG from the group of one or more PRGs based on the indication included in the report.

12. A method for wireless communications by a network entity, comprising:
receiving, from a user equipment (UE), a report that includes an indication of a desired precoding comprising a singular value decomposition (SVD) precoding, a partial SVD precoding, or a random precoding per precoding resource block group (PRG) for a group of one or more PRGs; and
sending, to the UE, one or more downlink (DL) transmissions on the group of one or more PRGs, with precoding based on the indication included in the report.

13. The method of claim 12, wherein the report further includes the indication of a desired demodulator, and wherein the indication comprises an integer value representing a specific demodulator from a look up table (LUT).

14. The method of claim 12, wherein the indication comprises an integer value representing the SVD precoding, the partial SVD precoding, or the random precoding.

15. The method of claim 12, wherein the report is received via one or more of a radio resource control (RRC) message, a physical uplink shared channel (PUSCH), or a channel state feedback (CSF) message.

16. The method of claim 12, further comprising receiving a request from the UE to reduce a size of at least one PRG from the group of one or more PRGs.

17. The method of claim 12, further comprising receiving, from the UE, signaling indicating a capability of the UE to reconfigure at least one demodulator per PRG for the group of one or more PRGs.

18. The method of claim 12, further comprising transmitting, to the UE, an indication of a maximum number of PRGs that can have the SVD precoding.

19. The method of claim 12, wherein:
the report indicates a first set of PRGs from the group of one or more PRGs for the SVD precoding; and
each of the first set of PRGs have one or more demodulators.

20. The method of claim 12, wherein the report indicates a second set of PRGs from the group of one or more PRGs for either the partial SVD precoding or the random precoding.

21. The method of claim 12, further comprising transmitting signaling to the UE indicating a size and a number of PRGs from the group of one or more PRGs that can have the SVD precoding, in response to the indication.

22. The method of claim 21, wherein the size and the number of PRGs from the group of one or more PRGs that can have the SVD precoding is based at least on a hardware load usage of the network entity.

23. The method of claim 21, wherein the signaling is transmitted via a radio resource control (RRC) message or a medium access control (MAC)— control element (CE) message, and is changed in a periodic or aperiodic manner.

24. The method of claim 12, further comprising transmitting signaling to the UE indicating an approval of the desired precoding per PRG from the group of one or more PRGs based on the indication included in the report.

25. An apparatus for wireless communications by a user equipment (UE), comprising:
at least one processor and a memory configured to:
transmit, to a network entity, a report that includes an indication of a desired precoding comprising a singular value decomposition (SVD) precoding, a partial SVD precoding, or a random precoding per precoding resource block group (PRG) for a group of one or more PRGs; and
demodulate one or more downlink (DL) transmissions, transmitted from the network entity on the group of one or more PRGs, in accordance with the indication included in the report.

26. The apparatus of claim 25, wherein the report further includes the indication of a desired demodulator, and wherein the indication comprises an integer value representing a specific demodulator from a look up table (LUT).

27. The apparatus of claim 25, wherein the indication comprises an integer value representing the SVD precoding, the partial SVD precoding, or the random precoding.

28. A non-transitory computer readable medium having instructions stored thereon for:
transmitting, by a user equipment (UE) to a network entity, a report that includes an indication of a desired precoding comprising a singular value decomposition (SVD) precoding, a partial SVD precoding, or a random precoding per precoding resource block group (PRG) for a group of one or more PRGs; and
demodulating, by the UE, one or more downlink (DL) transmissions, transmitted from the network entity on the group of one or more PRGs, in accordance with the indication included in the report.

29. The non-transitory computer readable medium of claim 28, wherein the report further includes the indication of a desired demodulator, and wherein the indication comprises an integer value representing a specific demodulator from a look up table (LUT).

30. The non-transitory computer readable medium of claim 28, wherein the indication comprises an integer value representing the SVD precoding, the partial SVD precoding, or the random precoding.

* * * * *